United States Patent [19]
Nakagiri

[11] Patent Number: 5,732,197
[45] Date of Patent: Mar. 24, 1998

[54] PRINTING CONTROL APPARATUS

[75] Inventor: Koji Nakagiri, Kawasaki, Japan

[73] Assignee: Canon Kabushiki Kaisha, Tokyo, Japan

[21] Appl. No.: 795,522

[22] Filed: Feb. 5, 1997

[30] Foreign Application Priority Data

Feb. 8, 1996 [JP] Japan .................................. 8-022549

[51] Int. Cl.$^6$ .................................................. G06K 15/00
[52] U.S. Cl. .................................................. 395/110; 375/115
[58] Field of Search ...................................... 395/101, 110, 395/112, 114, 115, 116, 167, 171, 526; 400/61–63, 67, 70, 72; 358/470, 404; 345/143

[56] References Cited

U.S. PATENT DOCUMENTS

| 5,093,903 | 3/1992 | Soduh et al. .................. 395/102 |
| 5,657,048 | 8/1997 | Shimizu .......................... 345/143 |

*Primary Examiner*—Arthur G. Evans
*Attorney, Agent, or Firm*—Fitzpatrick, Cella, Harper & Scinto

[57] ABSTRACT

When a font is to be registered, if the font can be classified into a character set which is used frequently, and a character set which is used not so frequently, one font is divided into a character set used frequently, and a character set of other characters, and a character set required for printing is registered. In this way, when registered characters need to be deleted to make way for registration of another character set, a character set with a low use frequency can be selectively deleted, and a character set with a high use frequency can be left stored. Hence, the use efficiency of the memory of the printing apparatus can be improved, and the printing speed can be increased.

23 Claims, 11 Drawing Sheets

| CHARACTER CODE | CHARACTER TYPE |
|---|---|
| 20-FF | 1-BYTE CHARACTER |
| 8140-829A | SYMBOL/ALPHANUMERIC CHARACTER |
| 829F-8396 | HIRAGANA/KATAKANA CHARACTER |
| 839F-83D6 | GREEK CHARACTER |
| 8440-8491 | RUSSIAN CHARACTER |
| 889F-9872 | FIRST-LEVEL KANJI CHARACTER |
| 989F-EAA4 | SECOND-LEVEL KANJI CHARACTER |
| OTHER | OTHER CHARACTER |

FIG. 5

| CHARACTER SET NUMBER | CHARACTER CODE | CHARACTER TYPE |
|---|---|---|
| 1 | 20 - FF | 1-BYTE CHARACTER |
| 2 | 8140 - 829A | SYMBOL/ALPHANUMERIC CHARACTER |
| 2 | 829F - 8396 | HIRAGANA/KATAKANA CHARACTER |
| 3 | 839F - 83D6 | GREEK CHARACTER |
| 3 | 8440 - 8491 | RUSSIAN CHARACTER |
| 4 | 889F - 9872 | FIRST-LEVEL KANJI CHARACTER |
| 5 | 989F - EAA4 | SECOND-LEVEL KANJI CHARACTER |
| 6 | OTHER | OTHER CHARACTER |

| CHARACTER SET ID |
| CharacterSet |
| FontData |
| CHARACTER SET SubID |
| CHARACTER CODE MANAGEMENT TABLE |
| USE FREQUENCY COUNTER |

| CHARACTER SET ID |
| CharacterSet |
| FontData |
| CHARACTER SET SubID |
| CHARACTER CODE MANAGEMENT TABLE |
| USE FREQUENCY COUNTER |

| CHARACTER SET ID |
| CharacterSet |
| FontData |
| CHARACTER SET SubID |
| CHARACTER CODE MANAGEMENT TABLE |
| USE FREQUENCY COUNTER |

| CHARACTER SET NUMBER | CHARACTER CODE | CHARACTER TYPE |
|---|---|---|
| 1 | 20-7A | 1-BYTE CHARACTER |
| 2 | 2121-237A | SYMBOL/ALPHANUMERIC CHARACTER |
| 2 | 2421-2576 | HIRAGANA/KATAKANA CHARACTER |
| 3 | 2621-2658 | GREEK CHARACTER |
| 3 | 2721-2771 | RUSSIAN CHARACTER |
| 4 | 3021-4F53 | FIRST-LEVEL KANJI CHARACTER |
| 5 | 5021-7426 | SECOND-LEVEL KANJI CHARACTER |
| 6 | OTHER | OTHER CHARACTER |

PRINTING CONTROL APPARATUS

BACKGROUND OF THE INVENTION

The present invention relates to a printing system which downloads image data of, e.g., characters from a host computer or the like to a printing apparatus such as a printer, and prints characters using the image data which have already been downloaded to the printing apparatus and, more particularly, to a printing control apparatus for transferring character images required for printing to a printing apparatus upon printing, and a data management method.

In recent years, a so-called WYSIWYG (What You See Is What You Get) environment, in which a host computer has a function of generating character image data, and generates and transfers character image data corresponding to individual resolutions to output apparatuses such as a display, printer, and the like, to allow a printing apparatus to print characters having the same design as those displayed on the display, has been realized. In such printing environment, the host computer must transfer character image data to the printing apparatus. Conventionally, when printing is performed in this environment, a method of transferring character image data for each character (character image drawing), and a method of storing temporarily stored character image data in the printing apparatus, and reusing the stored image data when identical characters are to be printed (character image downloading) are used.

In the method of performing printing by downloading character image data, the following management method is normally used in terms of printing control and data management. That is, a character group having the same character attributes (font name, character size, cell size, character modification, and the like) is defined as one character set, and characters included in the character set are identified based on their character codes. In this case, a combination of a character set and a character code expresses one character image data.

In general, the RAM on the printing apparatus has a limited capacity. For this reason, printing by downloading character image data is performed while limiting the number of character sets and the number of characters which can be registered or while the host computer calculates the free RAM capacity on the printing apparatus and checks if an additional character set can be downloaded. When the printing apparatus has reached an undownloadable state during printing, the host computer quits printing and switches to another printing method (e.g., image drawing), or deletes already downloaded data and downloads another data to the created free space. Conventionally, character images are printed by such methods. In one method of selecting a character set to be deleted, the number of printed characters included in each character set at that time is counted in units of character sets, and a character set with the smallest count value is deleted as one with the lowest use frequency.

In the method of deleting downloaded data and additionally downloading a character set, it is a common practice to delete data in units of character sets. However, since the character set is defined by a character group having the same character attributes, it may include character data with a high use frequency even when it is determined as the character set with the low use frequency. For this reason, when the character set is deleted, character data with the high use frequency are deleted together. As a consequence, temporarily deleted character data must be registered again, resulting in poor downloading efficiency.

SUMMARY OF THE INVENTION

The present invention has been made to solve the conventional problems, and has as its object to provide a printing control apparatus which can preclude the times required for registering and deleting data to attain high-speed processing by managing not to delete character image data that may be used frequently, and a data management method for the apparatus.

It is another object of the present invention to provide a printing control apparatus which can efficiently use the memory space that stores registered data, and a data management method for the apparatus.

It is still another object of the present invention to provide a printing control apparatus, which registers font information in a printing apparatus and controls the printing apparatus to output a character image corresponding to a character code by sending the character code therefrom to the printing apparatus, comprising: acquisition means for acquiring font information associated with a font of a character to be printed; discrimination means for discriminating based on the font information acquired by the acquisition means if the font is a font to be divided into a plurality of character sets; division means for, when the discrimination means determines that the font is to be divided, dividing the font into a plurality of character sets in accordance with the font; selection means for selecting a character set to which the character to be printed belongs from the plurality of character sets divided by the division means; and registration means for registering the character set selected by the selection means in the printing apparatus.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

[First Embodiment]

The preferred embodiments of the present invention will be described hereinafter with reference to the accompanying drawings.

Figure 1:
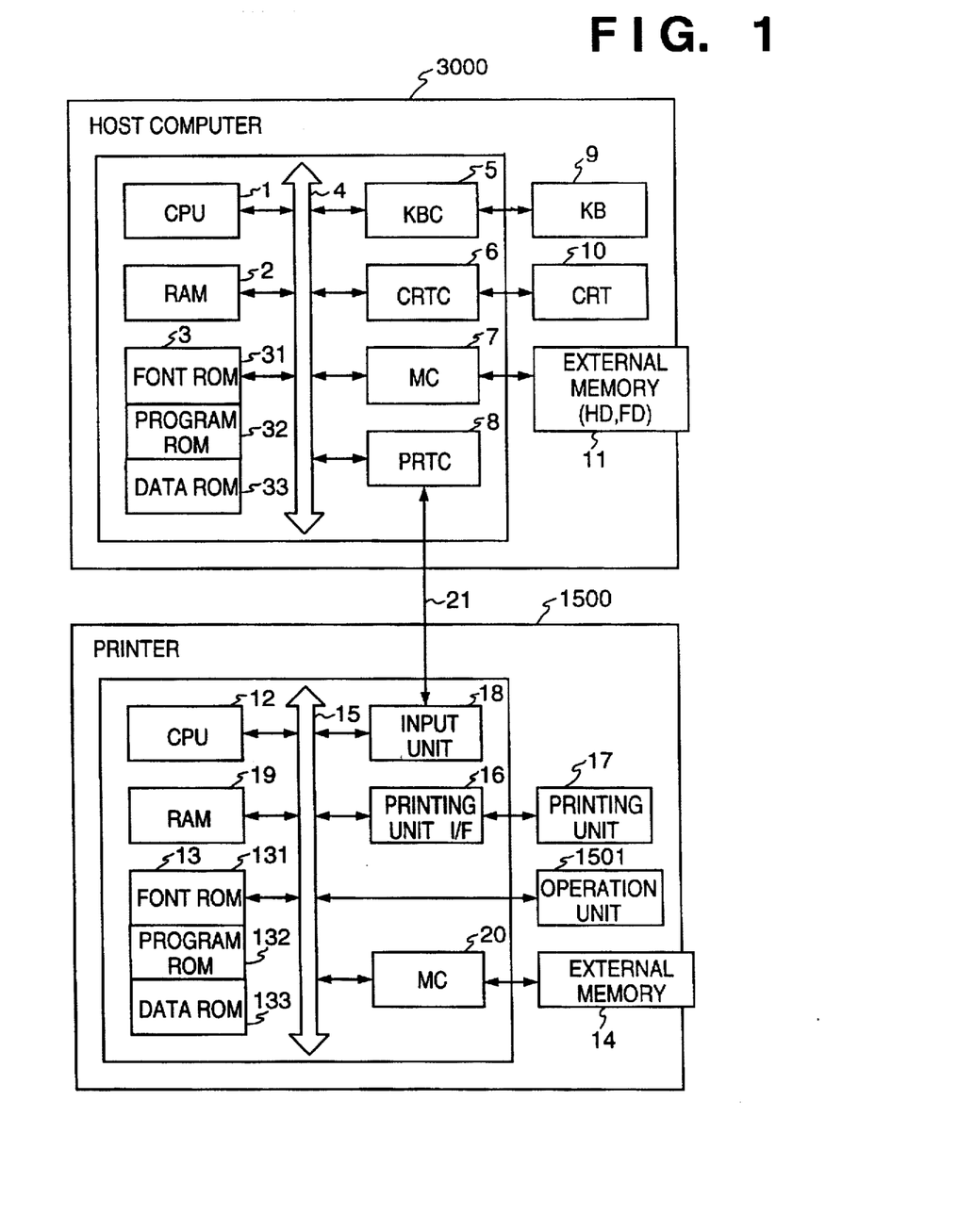
FIG. 1 is a block diagram for explaining the arrangement of a printing control apparatus according to an embodiment of the present invention.

FIG. 1 is a block diagram of a printing system according to an embodiment of the present invention. Note that the present invention can be applied to a stand-alone apparatus, a system constituted by a plurality of apparatuses, or a system that performs processing via a network such as a LAN as long as the functions of the present invention are executed.

Referring to FIG. 1, a host computer 3000 executes processing of documents including figures, images, characters, tables (including table calculations and the like), and the like on the basis of a document processing program stored in a program ROM 32 included in a ROM 3, or an external memory 11. A CPU 1 systematically controls the respective devices connected to a system bus 4 to control the entire apparatus.

The program ROM 32 or the external memory 11 stores an operating system program (to be referred to as an OS hereinafter) and the like as a control program of the CPU 1, a font ROM 31 in the ROM 3 or the external memory 11 stores font data and the like used in the document processing, and a data ROM 33 in the ROM 3 stores various data used in the document processing. A RAM 2 serves as a main memory, work area, and the like of the CPU 1. A keyboard controller (KBC) 5 controls the key inputs from a keyboard 9 and a pointing device (not shown). A CRT controller (CRTC) 6 controls display of a CRT display (CRT) 10. A disk controller (DKC) 7 controls accesses to the external memory 11 such as a hard disk (HD), a floppy disk (FD), or the like, which stores various application programs, font data, user files, edit files, a character image data generation program (to be referred to as a font rasterizer hereinafter), a printer control command generation program (to be referred to as a printer driver hereinafter), and the like. A printer controller (PRTC) 8 is connected to a printer 1500 via a predetermined two-way interface 21 and executes communication control processing with the printer 1500. Note that the CPU 1 executes development (rasterizing) processing of outline fonts onto a display information RAM set on, e.g., the RAM 2 to realize the WYSIWYG environment on the CRT 10. The CPU 1 opens various registered windows on the basis of commands indicated by, e.g., a mouse cursor (not shown) on the CRT 10 and executes various kinds of data processing.

In the printer 1500, a printer CPU 12 outputs an image signal to a printing unit (printer engine) 17 connected to a system bus 15 on the basis of a control program stored in a program ROM 132 in a ROM 13 or a control program stored in an external memory 14. The program ROM 132 stores the control program and the like of the CPU 12. A font ROM 131 in the ROM 13 stores font data and the like used upon generating the output information, and a data ROM 133 in the ROM 13 stores information and the like used on the host computer when the printer has no external memory 14 such as a hard disk or the like. The CPU 12 can execute communication processing with the host computer via an input unit 18, and can inform the host computer 3000 of information in the printer. A RAM 19 serves as a main memory, work area, and the like of the CPU 12, and its memory capacity can be expanded by an optional RAM connected to an expansion port (not shown). Note that the RAM 19 is also used as an area for developing output information, an area for storing environment data, and the like. An NVRAM is often used as the RAM 19. Accesses to the above-mentioned external memory 14 such as a hard disk (HD), an IC card, or the like are controlled by a memory controller (MC) 20. The external memory 14 is connected as an optional device, and stores font data, an emulation program, form data, and the like. An operation panel 1501 has operation switches, LED indicators, and the like.

The number of external memories is not limited to one, and at least one external memory is connected. In addition to internal font data, a plurality of devices such as an optional font card, a storage medium that stores a program for interpreting a printer control language for a different language system, and the like can be connected as the external memories. Furthermore, an NVRAM (not shown) may be arranged, and store printer mode setting information input from the operation panel 1501.

The printing system of this embodiment will be described in detail below using the flow chart and the like.

Figure 2:
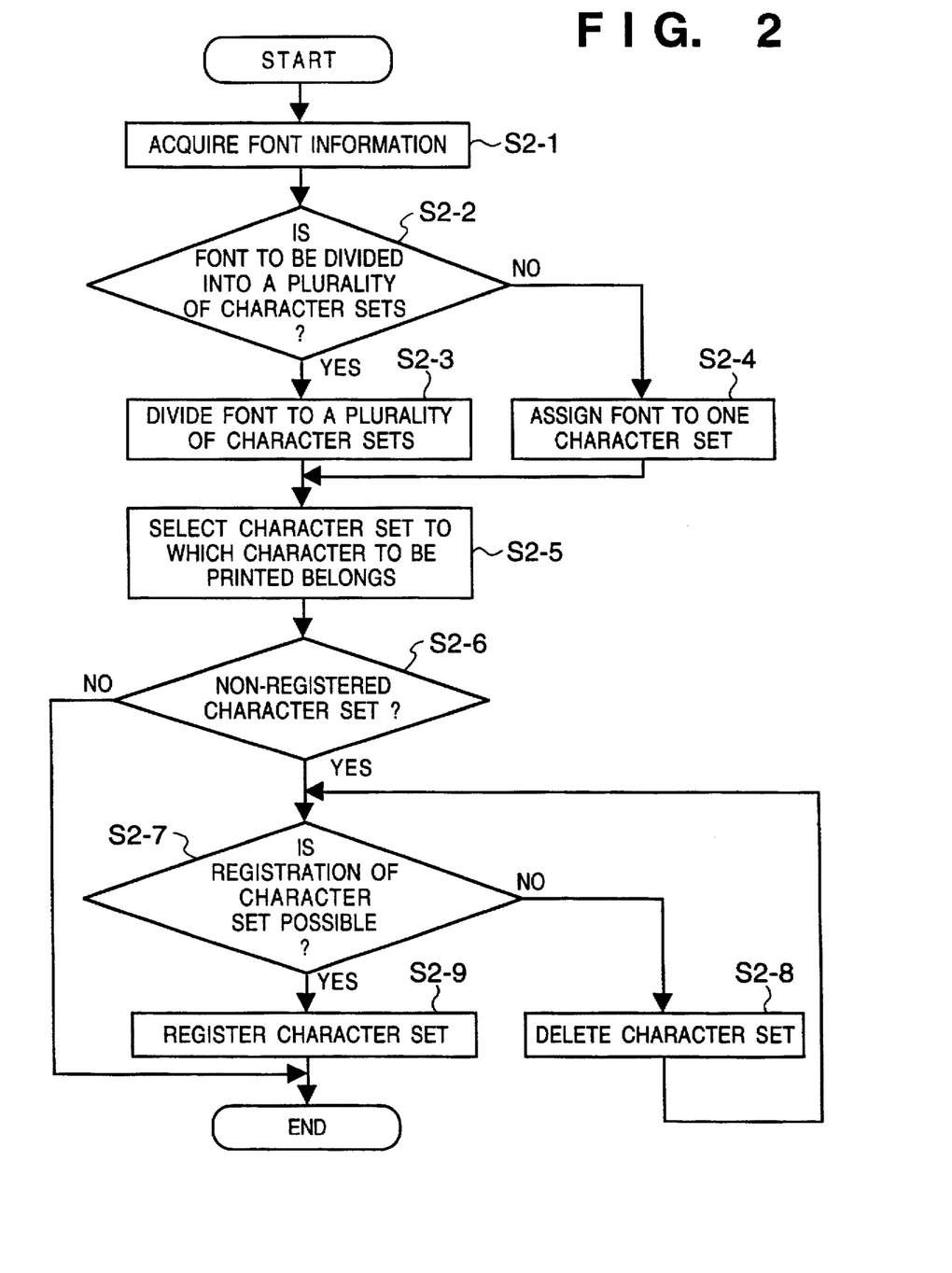
FIG. 2 is a flow chart showing the processing sequence in a printer driver of the first invention.

FIG. 2 is a flow chart showing the processing sequence in the printer driver running on the host computer upon downloading download data such as font data from the host computer to the printing apparatus. The processing sequence shown in FIG. 2 will be briefly described. In step 2-1, font information of a font to be used is acquired from the operating system (OS) or an application program on the host computer that controls the printer driver. In Step 2-2, it is checked on the basis of the font information acquired in step 2-1 if the font can be divided into a plurality of character sets. If YES in step 2-2, the font is divided and assigned to a plurality of character sets in step 2-3. On the other hand, if NO in step 2-2, the font as a whole is assigned to a single character set in step 2-4.

In step 2-5, a character set to which the character to be printed belongs is selected. It is then checked in step 2-6 if the character set selected in step 2-5 is already registered in the printing apparatus. If YES in step 2-6, the processing ends; otherwise, it is checked if the character set can be additionally registered in the printing apparatus (step 2-7). If YES in step 2-7, the character set is registered in the printing apparatus in step 2-9. However, if NO in step 2-7, an appropriate character set which has already been registered in the printing apparatus is deleted in step 2-8, and the flow returns to step 2-7. Thereafter, the processing in steps 2-7 and 2-8 is repeated until the character set can be registered.

The embodiment of the processing of the printer driver shown in FIG. 2 will be described in detail below.

In step 2-1 of acquiring the font information in FIG. 2, the information to be acquired depends on how an interface with the OS or application program that controls the printer driver is implemented. In this embodiment, the following font information is acquired from the OS.

---

Font information: Code CharacterSet FontData x y ...(data 1)
Code: character code (character code including a character to be printed)
CharacterSet: character set (indicating character type)
FontData: font data (font attribute)
x, y: printing position

---

Note that this font data (FontData) includes information associated with a font (e.g., font name, character pattern size, character modification information, pitch information, and the like) with which each character image data can be sufficiently specified.

Figure 3:
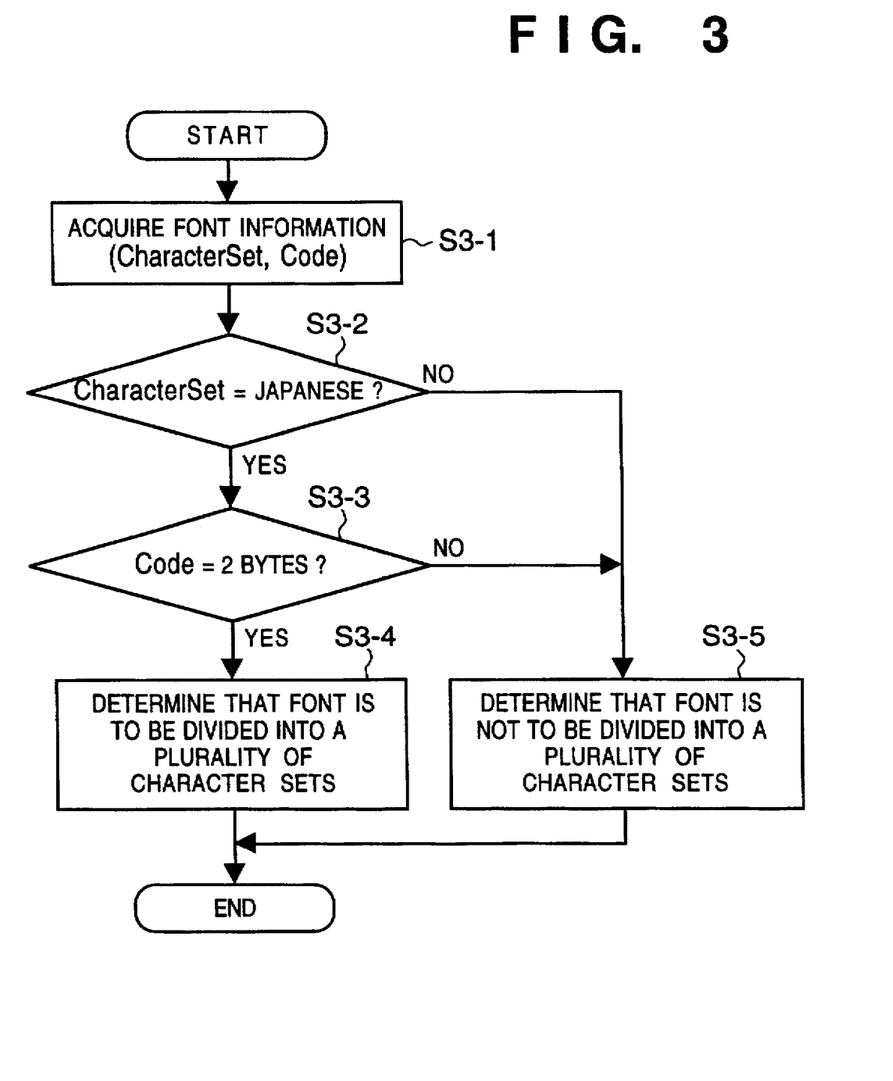
FIG. 3 is a flow chart showing the processing sequence for discriminating if a font can be divided into a plurality of character sets.

FIG. 3 is a flow chart showing the processing in step 2-2 in FIG. 2. Assume that character sets belong to either Japanese or English, for the sake of simplicity. In step 3-1, CharacterSet and Code are received, and it is checked in step 3-2 if the character set expressed by CharacterSet is a Japanese one. If NO in step 3-2, this system can specify that the character set is an English one, and it is determined in step 3-5 that the character set is not to be divided into a plurality of character sets. However, if YES in step 3-2, it is checked in step 3-3 if Code is 2 bytes. If YES in step 3-3, it is determined in step 3-4 that the character set is to be divided into a plurality of character sets. On the other hand, if NO in step 3-3, 1 byte is determined, and it is determined in step 3-5 that the character set is not divided into a plurality of character sets.

Figure 4:
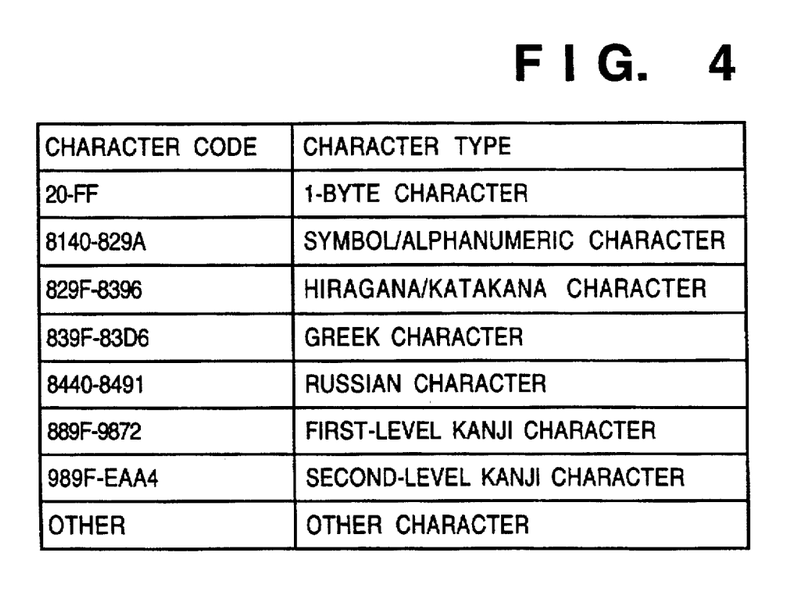
FIG. 4 is a table showing the relationship between character codes and character type in Shift JIS codes.

In the processing for dividing a font into a plurality of character sets in step 2-3 in FIG. 2, the font is divided into a plurality of character sets in accordance with the use frequencies of characters. In a language using a large number of characters such as Japanese, character codes are often allocated to some extent on the basis of the use frequencies of characters. For example, in the case of Shift JIS (Japanese Industrial Standard) codes, character codes are allocated in units of character types, as shown in FIG. 4. A case will be exemplified using Shift JIS codes wherein a font is divided into many character sets (FIG. 5).

Figure 5:
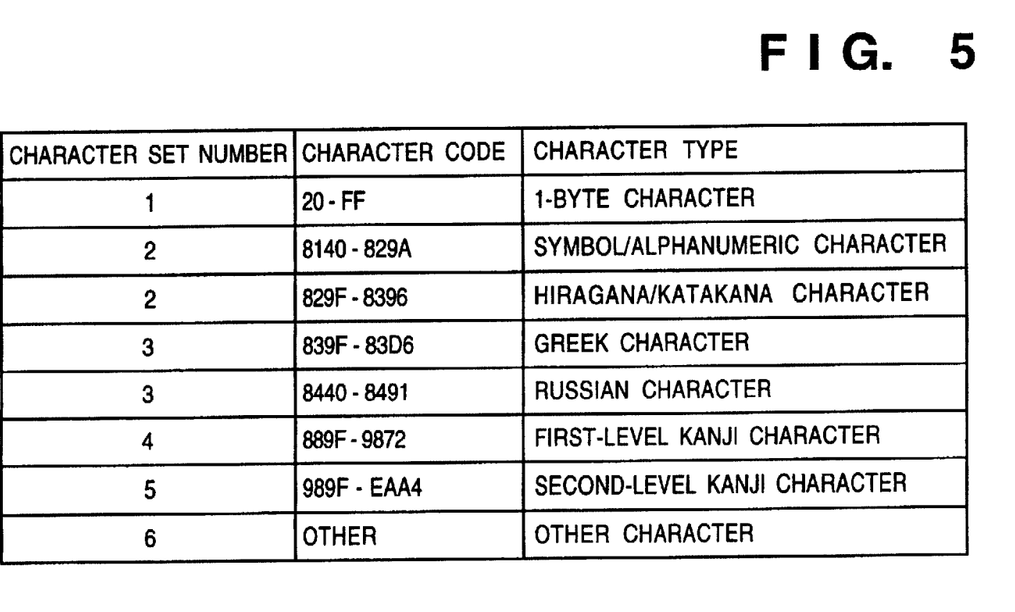
FIG. 5 is a table showing the method of dividing a font expressed by Shift JIS codes into a plurality of character sets.

As indicated by a character set number in FIG. 5, Shift JIS codes are processed as one font on the host computer, and are divided into two character sets, i.e., 1-byte codes and 2-byte codes. This font is divided into six character sets Nos. 1 to 6 in correspondence with the use frequencies of characters in units of character types.

For this purpose, the Shift JIS font in FIG. 5 is divided in units of character types, which are determined in correspondence with character codes. In step 2-5 in FIG. 2, a character set to which the character to be printed belongs can be uniquely determined based on the character code. More specifically, a character set can be specified in accordance with FIG. 5.

In step 2-6 in FIG. 2, it is checked if the character set selected in step 2-5 is not registered in the printing apparatus yet. The printer driver divides the font into a plurality of character sets upon downloading character set, and manages character sets already registered in the printing apparatus and characters belonging to the registered character sets. For this reason, it can be determined if the character set obtained in step 2-5 is not registered yet. Note that an example of the discrimination method will be described as an example of the printing system that performs printing by downloading character image data according to the present invention. In step 2-6, as a result of checking, if the character set has already been registered, the processing ends. On the other hand, if the character set is not registered yet, the character set must be newly registered in the printing apparatus. However, it may often be impossible to additionally register the character set due to limitations of the free memory capacity on the printing apparatus, the specifications of commands that control the printing apparatus, and the like. This state is checked in step 2-7, and if registration is possible, the character set is registered in step 2-9. However, if registration is impossible, registration of the character set may be aborted and printing may be performed using another method (e.g., image drawing). However, in this case, an unnecessary one of character sets already registered in the printing apparatus is deleted (step 2-8).

An example of the printing method using the character image download management method according to the present invention described above will be explained in detail below.

Figure 6:
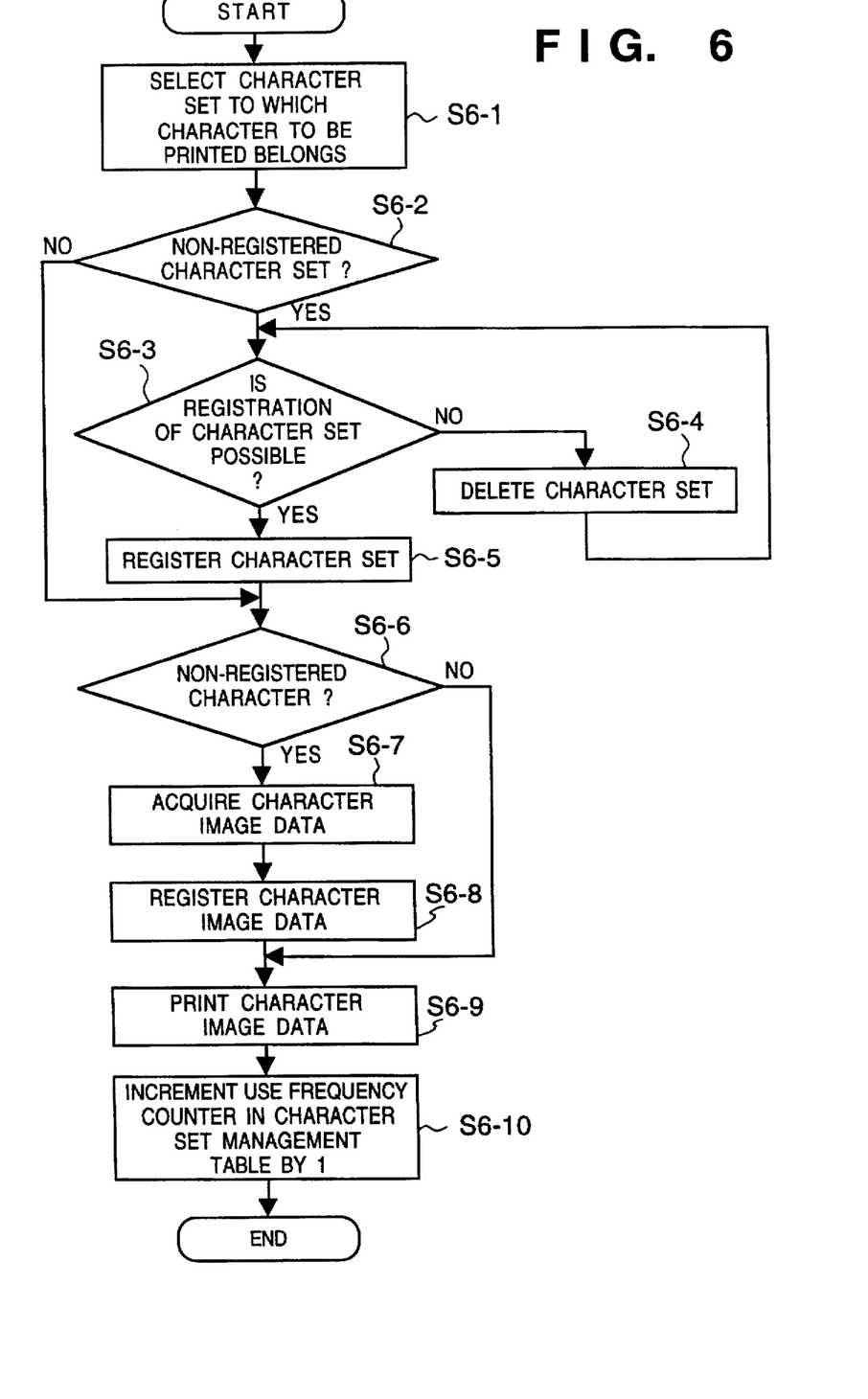
FIG. 6 is a flow chart showing the processing sequence in a printer driver for performing character image printing that practices the present invention.

FIG. 6 is a flow chart showing the processing by the printer driver that adopts the present invention. When the host computer instructs the printer apparatus to perform printing, a character set to which the character to be printed belongs is selected in step 6-1. In this step, a character set is selected by the same processing as that in steps 2-1 to 2-5 in FIG. 2. In steps 6-2 to 6-5, character set registration processing is attained by the same processing as that in steps 2-6 to 2-9 in FIG. 2.

Figure 7:
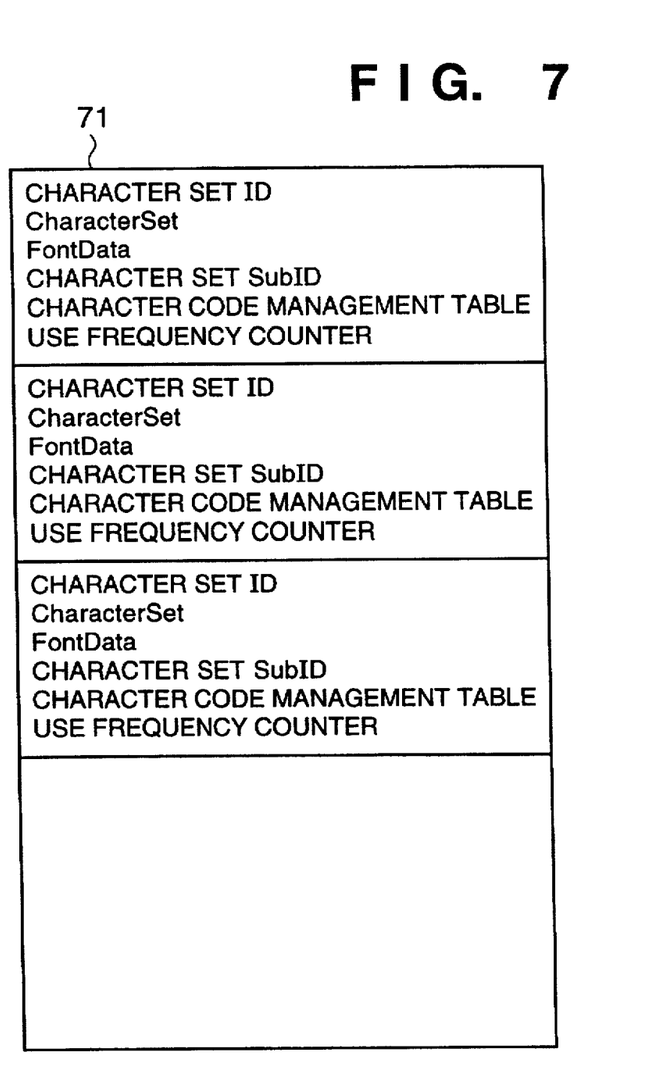
FIG. 7 is a table for explaining a character set management table.

In step 6-2 of checking if the character set is not registered, step 6-4 of deleting a character set, and step 6-5 of registering the character set, a character set management table 71 shown in FIG. 7 is used. The character set management table 71 includes information concerning character sets already registered in the printing apparatus and characters included in the character sets. The character set management table 71 manages a list of character set information corresponding to the character sets registered in the printing apparatus. Each character set information includes the division result of the character set in step 2-5 executed in step 6-1 as character set SubID in addition to CharacterSet and FontData of data 1 described above. As character set SubID, the character set number described in FIG. 5 may be used. Furthermore, the character code management table includes information associated with already registered characters of each character set. Note that character set ID in FIG. 7 is an ID for calling data using the character set ID and a character code (Code) upon printing character image data registered in the printing apparatus, and is a numerical value unique to each character set. The character set management table 71 is formed on the RAM 2 in FIG. 1, and is stored on the RAM 2 from the start time to the end of a series of printing processes and is managed by the printer driver executed by the CPU 1. The character set management table also includes a use frequency counter for counting the number of times of use of a character included in each character set in units of character sets.

In step 6-2, whether or not a character set is registered is discriminated by checking with reference to the contents of the character set management table 71 if the list includes a character set whose information (CharacterSet, FontData, character set SubID) for identifying the character set matches that of the character set of interest. Upon registering the character set in step 6-5, new character set information is added to the character set management table 71, and at the same time, character set information is transferred to the RAM 19 or the external memory 14 via the interface 21 (FIG. 1). An example of data upon registering the character set in the printing apparatus is as follows:

Character set registration data: CharSetID CharSetSubID CharacterSet
FontData ...(Data2)
CharSetID: character set ID
CharSetSubID: character set SubID
CharacterSet: character set
FontData: font data Upon deleting a character set in step 6-4, the corresponding character set information is deleted from the character set management table, and the character set which is stored in the RAM 19 or the external memory 14 and corresponds to the deleted character set information is deleted via the interface 21 (FIG. 1). In this case, as a method of selecting the character set to be deleted, for example, a method of using the number of times of use of each character set in a series of print jobs is popularly used. This procedure will be described later. In addition, priority may be assigned to each character type in advance, and the character set to be deleted may be determined or selected in accordance with the priority. An example of data upon deleting the character set from the printing apparatus is as follows:

```
Character set deletion data: CharSetID   ...(data 3)
CharSetID: character set ID
```

In step 6-6, it is checked if image data of the character to be printed has already been registered in the printing apparatus. In this case, a character code management table is used. This table is formed on the RAM 2 or the external memory 11 shown in FIG. 1. The table includes data indicating registration or non-registration corresponding to each character code. More specifically, a method of expressing registration or non-registration of each character code by 1 bit, a method of managing registered character codes in the form of a list, or the like is used. In step 6-6, it is checked with reference to this table if the character to be printed is non-registered. If YES in step 6-6, character image data is acquired in step 6-7, and the character image data acquired in step 6-7 is transferred to the RAM 19 or the external memory 14 of the printing apparatus via the interface 21 in step 6-8. An example of data upon registering character image data in the printing apparatus is as follows:

```
Character image registration data: Code CharSetID ImageData   ...(data 4)
Code: character code
CharSetID: character set ID
ImageData: character image data
```

In step 6-8, information of the newly registered character is recorded in the character code management table. In transferring the character image data, the ImageData may be compressed to reduce the data transfer amount. In step 6-9, the printing processing of the registered character is performed. In this step, the printer driver transfers, e.g., the following data to the RAM 19 via the interface 21 in FIG. 1:

```
Registered character printing data: Code CharSetID x y   ...(data 5)
Code: character code
CharSetID: character set ID
x, y: printing position
```

The printing apparatus performs processing for drawing character image data corresponding to Code and CharSetID at the position indicated by x and y.

Finally, in step 6-10, the frequency counter included in the character set management table and corresponding to the character set used is incremented by 1.

Figure 11:
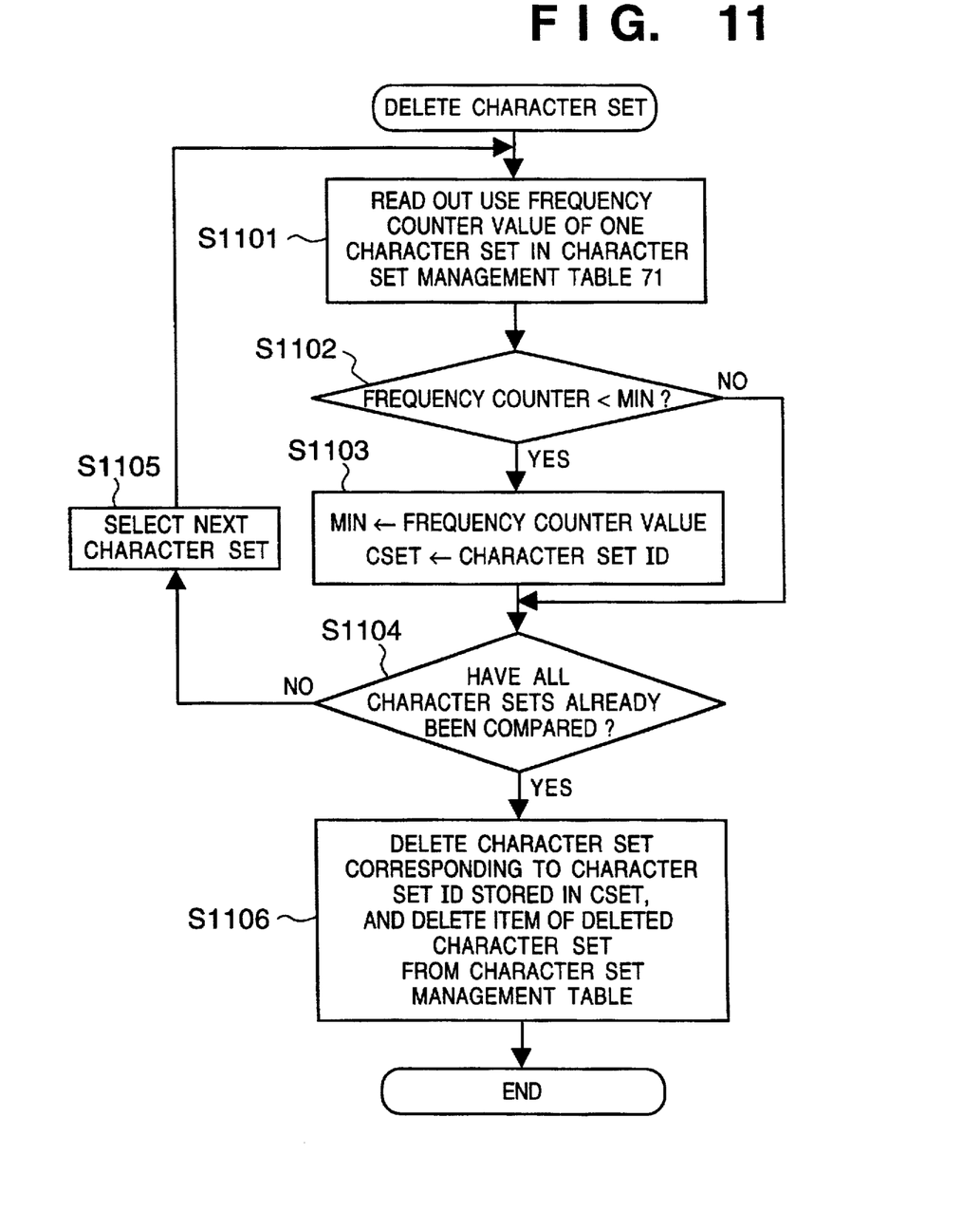
FIG. 11 is a flow chart showing the sequence for deleting a character set.

FIG. 11 is a flow chart showing the procedure of selecting the character set to be deleted in this embodiment. This procedure corresponds to step 6-4 in FIG. 6.

In step S1101, the use frequency counter of a character set corresponding to the character set ID registered at the head of the character set management table 71 is read out. In step S1102, the value of the readout use frequency counter is compared with the contents of a variable MIN. Note that the initial value of the variable MIN is equal to or larger than 1. The use frequency counter is reset to 0 when the character set is registered.

As a result of comparison in step S1102, if the variable MIN is larger than the counter value, the value of the use frequency counter compared is substituted in the value of the variable MIN, and the character set ID of the character set is substituted in a variable CSET.

After steps S1101 to S1103 are repeated for all the character sets registered in the character set management table 71, the variable CSET stores the character set ID corresponding to the minimum use frequency counter value.

In step S1106, the character set corresponding to the character set ID stored in the variable CSET is deleted from the printing apparatus, and the item corresponding to the deleted character set is deleted from the character set management table.

With the above-mentioned procedure, the character set with the lowest use frequency can be deleted from the printing apparatus.

In the flow chart of the printing system using the character image downloading method according to the present invention shown in FIG. 6, since the division processing of the character set is performed, the unit of deletion in step 6-4 is small.

Figure 8:
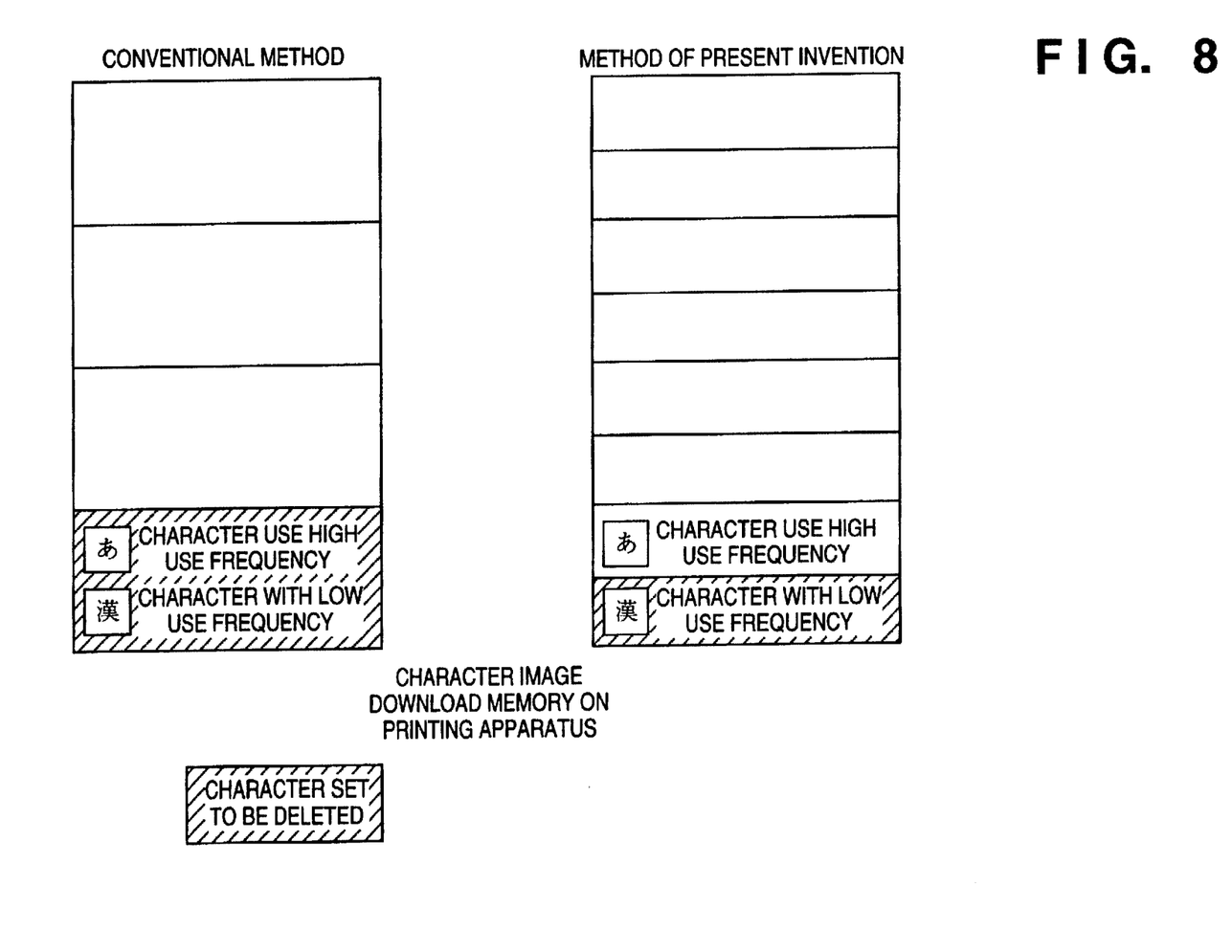
FIG. 8 is a view showing character sets registered on a RAM on a printing apparatus or an external storage device and character image data.

FIG. 8 is a view showing the character sets and character image data registered on the RAM on the printing apparatus or the external memory. As compared to the conventional management method that always assigns one font to one character set, when the character set is to be deleted using the method of the present invention, as shown in FIG. 8, image data of characters with high use frequencies are not easily deleted since the character image data to be deleted are divided in correspondence with their use frequencies. When the memory on the printing apparatus, which memory can be used for downloading character image data, has a limited capacity, the registered data of characters with low use frequencies take up a large memory space and impair memory efficiency in the conventional method. However, when the present invention is applied, since only image data of characters with low use frequencies are deleted, the limited memory on the printing apparatus can be effectively used. Furthermore, the number of transfer times of image data of identical characters upon deleting registered data of characters with high use frequencies can be decreased, thus increasing the printing speed.

In the above embodiment, character image data have been exemplified. Also, even in a printing system that registers outline data of characters in the printing apparatus, the present invention can be applied by using character outline data in place of character image data.

Figure 9:
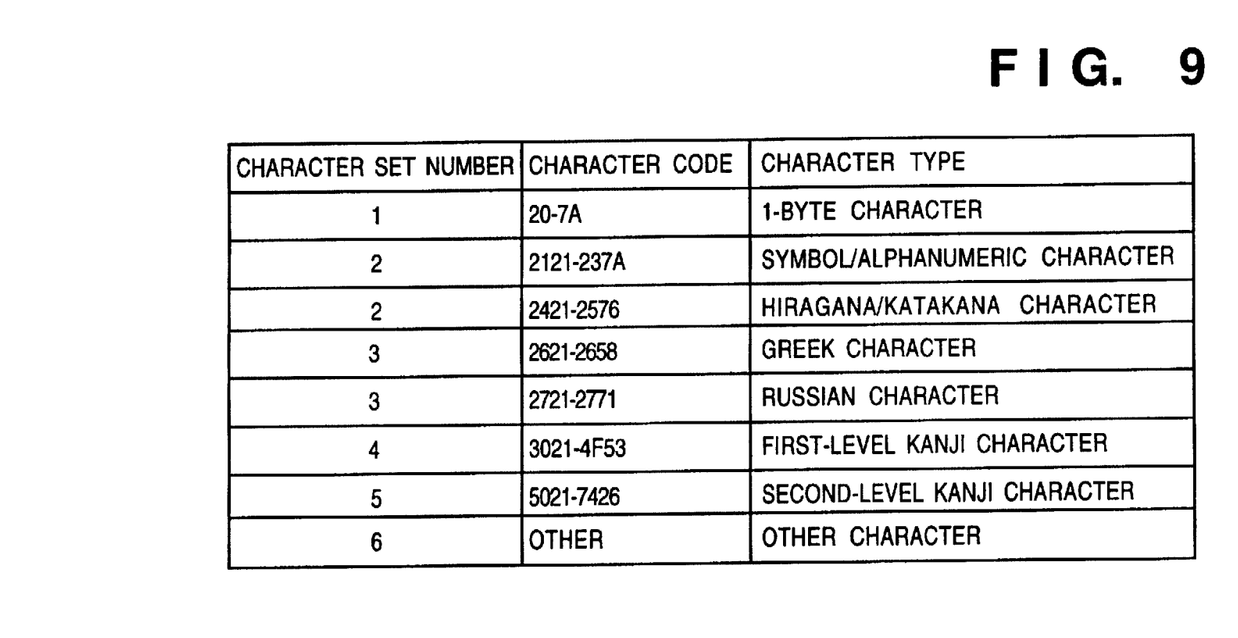
FIG. 9 is a table showing the method of dividing a font expressed by JIS codes into a plurality of character sets.

In the above embodiment, Shift JIS codes have been exemplified. However, the present invention can be applied to other character code systems that can use Japanese such as JIS codes, EUC codes, and the like. FIG. 9 shows a division example of character sets when the present invention is applied to JIS codes.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU, MPU, or the like) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 10:
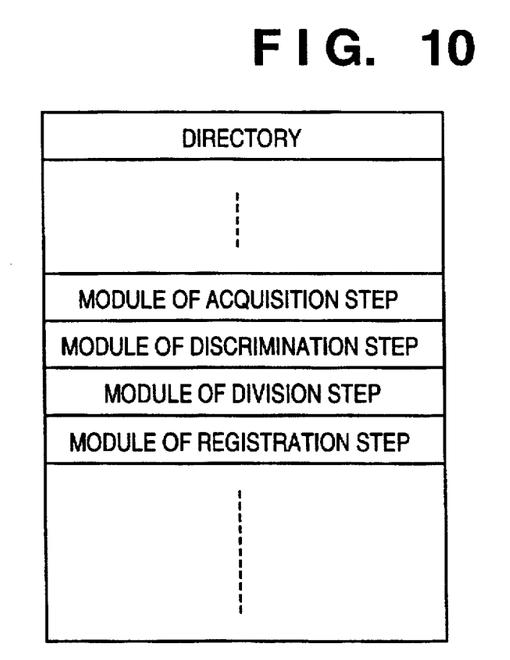
FIG. 10 is a memory map of a program that realizes the present invention.

When the present invention is applied to the storage medium, the storage medium stores program codes corresponding to the above-mentioned flow chart. This will be described briefly. In this case, modules shown in an example of the memory map in FIG. 10 are stored in the storage medium.

More specifically, the storage medium need only store at least program codes of the following respective modules: the code of the acquisition step of acquiring font information to which the character to be printed belongs, the code of the discrimination step of discriminating if the font information acquired in the acquisition step indicates the font to be divided into a plurality of character sets, the code of the division step of dividing the font into a plurality of character sets when it is determined in the discrimination step that the font is to be divided, the code of the selection step of selecting a character set to which the character to be printed belongs, and the code of the registration step of registering the character set selected in the selection step in the printing apparatus.

As described above, the printing system, printing control apparatus, and download management method according to the present invention can prevent character image data that may be used frequently from being deleted.

The limited memory space on the printing apparatus, which can be used for downloading data, can be efficiently used.

By improving the downloading efficiency, the printing speed can be increased.

As many apparently widely different embodiments of the present invention can be made without departing from the spirit and scope thereof, it is to be understood that the invention is not limited to the specific embodiments thereof except as defined in the appended claims.

What is claimed is:

1. A printing control apparatus, which registers font information in a printing apparatus and controls the printing apparatus to output a character image corresponding to a character code by sending the character code therefrom to the printing apparatus, comprising:

acquisition means for acquiring font information associated with a font of a character to be printed;

discrimination means for discriminating based on the font information acquired by said acquisition means if the font is a font to be divided into a plurality of character sets;

division means for, when said discrimination means determines that the font is to be divided, dividing the font into a plurality of character sets in accordance with the font;

selection means for selecting a character set to which the character to be printed belongs from the plurality of character sets divided by said division means; and registration means for registering the character set selected by said selection means in the printing apparatus.

2. The apparatus according to claim 1, further comprising second discrimination means for, when said registration means registers the character set, discriminating if the character set can be registered in the printing apparatus, and deletion means for, when the character set cannot be registered, deleting an already registered character set from the printing apparatus.

3. The apparatus according to claim 1, wherein when the character to be printed belongs to a font expressed by 2-byte codes, said discrimination means determines that the font is to be divided into a plurality of character sets, and when the character to be printed belongs to a font expressed by 1-byte codes, said discrimination means determines that the font is not to be divided into a plurality of character sets.

4. The apparatus according to claim 2, wherein said deletion means deletes a character set with a lowest use frequency of a plurality of character sets registered in the printing apparatus.

5. The apparatus according to claim 1, wherein when the character to be printed is expressed by a 2-byte code, said division means divides the font that includes the character to be printed into at least two character sets including a character set consisting of characters with a high use frequency and a character set consisting of characters with a low use frequency.

6. The apparatus according to claim 1, wherein when the character to be printed is expressed by a Japanese 2-byte code, said division means divides the font into a character set consisting of kanji characters and a character set consisting of non-kanji characters.

7. The apparatus according to claim 1, wherein when the character to be printed is expressed by a Japanese 2-byte code, said division means divides the font into a character set consisting of characters with a high use frequency included in non-kanji characters, and a character set consisting of other characters.

8. The apparatus according to claims 1, wherein when the character to be printed is expressed by a Japanese 2-byte code, said division means divides the font into a character set consisting of hiragana characters, katakana characters, and alphanumeric characters, and a character set consisting of other characters.

9. The apparatus according to claim 1, wherein when the character to be printed is expressed by a Japanese 2-byte code, said division means divides the font into a character set consisting of JIS first-level kanji characters, and a character set consisting of JIS second-level kanji characters.

10. The apparatus according to claim 6, wherein when the character to be printed is expressed by a Japanese 2-byte code, said division means further divides the character set consisting of the non-kanji characters into a character set consisting of characters with a high use frequency, and a character set consisting of other characters.

11. The apparatus according to claims 1, wherein when the character to be printed is expressed by a Japanese 2-byte code, said division means further divides the character set consisting of the non-kanji characters into a character set consisting of hiragana characters, katakana characters, and alphanumeric characters, and a character set consisting of other characters.

12. A data management method upon registering font information in a printing apparatus, comprising:

an acquisition step, acquiring font information associated with a font of a character to be printed;

a discrimination step, discriminating based on the font information acquired in the acquisition step if the font is a font to be divided into a plurality of character sets;

a division step, dividing the font into a plurality of character sets in accordance with the font when it is determined in the discrimination step that the font is to be divided;

a selection step, selecting a character set to which the character to be printed belongs from the plurality of character sets divided in the division step; and     a registration step, registering the character set selected in the selection step in the printing apparatus.

13. The method according to claim 12, further comprising the second discrimination step of discriminating if the character set can be registered in the printing apparatus, when the character set is to be registered in the registration step, and the deletion step of deleting an already registered character set from the printing apparatus when the character set cannot be registered.

14. The method according to claim 12, wherein the discrimination step includes the step of determining that the font is to be divided into a plurality of character sets when the character to be printed belongs to a font expressed by 2-byte codes, and the step of determining that the font is not to be divided into a plurality of character sets when the character to be printed belongs to a font expressed by 1-byte codes.

15. The method according to claim 13, wherein the deletion step includes the step of deleting a character set with a lowest use frequency of a plurality of character sets registered in the printing apparatus.

16. The method according to claim 12, wherein the division step includes the step of dividing the font that includes the character to be printed into at least two character sets including a character set consisting of characters with a high use frequency and a character set consisting of characters with a low use frequency, when the character to be printed is expressed by a 2-byte code.

17. The method according to claim 12, wherein the division step includes the step of dividing the font into a character set consisting of kanji characters and a character set consisting of non-kanji characters, when the character to be printed is expressed by a Japanese 2-byte code.

18. The method according to claim 12, wherein the division step includes the step of dividing the font into a character set consisting of characters with a high use frequency included in non-kanji characters, and a character set consisting of other characters, when the character to be printed is expressed by a Japanese 2-byte code.

19. The method according to claims 12, wherein the division step includes the step of dividing the font into a character set consisting of hiragana characters, katakana characters, and alphanumeric characters, and a character set consisting of other characters, when the character to be printed is expressed by a Japanese 2-byte code.

20. The method according to claim 12, wherein the division step includes the step of dividing the font into a character set consisting of JIS first-level kanji characters, and a character set consisting of JIS second-level kanji characters, when the character to be printed is expressed by a Japanese 2-byte code.

21. The method according to claim 12, wherein the division step includes the step of further dividing the character set consisting of the non-kanji characters into a character set consisting of characters with a high use frequency, and a character set consisting of other characters, when the character to be printed is expressed by a Japanese 2-byte code.

22. The method according to claim 12, wherein the division step includes the step of further dividing the character set consisting of the non-kanji characters into a character set consisting of hiragana characters, katakana characters, and alphanumeric characters, and a character set consisting of other characters, when the character to be printed is expressed by a Japanese 2-byte code.

23. A computer readable memory that stores a data management program upon registering font information in a printing apparatus, comprising:

code of an acquisition step of acquiring font information associated with a font of a character to be printed;

code of a discrimination step of discriminating based on the font information acquired in the acquisition step if the font is a font to be divided into a plurality of character sets;

code of a division step of dividing the font into a plurality of character sets in accordance with the font when it is determined in the discrimination step that the font is to be divided;

code of a selection step of selecting a character set to which the character to be printed belongs from the plurality of character sets divided in the division step; and     code of a registration step of registering the character set selected in the selection step in the printing apparatus.

\* \* \* \* \*